US007548755B2

(12) United States Patent
Kim

(10) Patent No.: US 7,548,755 B2
(45) Date of Patent: Jun. 16, 2009

(54) METHOD AND APPARATUS FOR CONVERTING SMS MESSAGE INTO MMS COMPLIANT IMAGE FILE IN MOBILE COMMUNICATIONS

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 11/370,798

(22) Filed: Mar. 7, 2006

(65) Prior Publication Data
US 2006/0200568 A1    Sep. 7, 2006

(30) Foreign Application Priority Data
Mar. 7, 2005    (KR)    ...................... 10-2005-0018820

(51) Int. Cl.
*H04W 4/00* (2009.01)
(52) U.S. Cl. .................................... 455/466; 455/414.4
(58) Field of Classification Search ............... 455/414.1, 455/414.2, 414.4, 404.1, 404.2, 456.1, 457, 455/466, 566, 552.1, 420; 370/331, 328, 370/338, 349, 496, 522; 709/231, 237, 204, 709/206; 348/14.01, 333.01, 333.06, 333.11
See application file for complete search history.

(56) References Cited

U.S. PATENT DOCUMENTS

| | | | |
|---|---|---|---|
| 7,069,301 B2* | 6/2006 | Jerbi et al. ................... 709/206 |
| 7,283,854 B2* | 10/2007 | Sato et al. ................ 455/575.3 |
| 2002/0032027 A1* | 3/2002 | Kirani et al. ................. 455/426 |
| 2002/0143975 A1* | 10/2002 | Kimura et al. .............. 709/231 |
| 2003/0211856 A1* | 11/2003 | Zilliacus ...................... 455/466 |
| 2004/0063449 A1* | 4/2004 | Fostick ........................ 455/517 |
| 2004/0185883 A1* | 9/2004 | Rukman ...................... 455/466 |
| 2004/0186723 A1* | 9/2004 | Mizutani et al. .......... 704/270.1 |
| 2004/0214541 A1* | 10/2004 | Choi ........................ 455/186.1 |
| 2005/0136886 A1* | 6/2005 | Aarnio et al. ............. 455/404.2 |
| 2005/0143136 A1* | 6/2005 | Lev et al. ..................... 455/566 |

FOREIGN PATENT DOCUMENTS

KR    10 2006 0031932 A    4/2006

* cited by examiner

*Primary Examiner*—Jean Gelin
(74) *Attorney, Agent, or Firm*—Lee, Hong, Degerman, Kang & Waimey

(57) ABSTRACT

A method an apparatus for converting a relatively large sized SMS message that may contain special characters or emoticons into an appropriate MMS image format file to allow sending, receiving and storage via different types of mobile communication terminals that have varying capabilities. The user need not delete old messages from his SMS message inbox or outbox to accommodate large sized SMS messages, as the converted messages can be stored in a separate image file memory. The MMS compliant image format allows a recipient to properly receive messages even though the recipient mobile terminal does not fully support the displaying of certain SMS special characters, emoticons, or the like.

21 Claims, 4 Drawing Sheets

METHOD AND APPARATUS FOR CONVERTING SMS MESSAGE INTO MMS COMPLIANT IMAGE FILE IN MOBILE COMMUNICATIONS

CROSS REFERENCE TO RELATED APPLICATION

Pursuant to 35 U.S.C. § 119(a), this application claims the benefit of earlier filing date and right of priority to Korean Application No. 10-2005-0018820, filed Mar. 7, 2005, the contents of which are hereby incorporated by reference herein in their entirety.

BACKGROUND OF THE INVENTION

1. Field of the Invention

The present invention relates to a mobile communications terminal such as a cellular phone, (hereinafter, referred to simply as a "mobile terminal"), and more particularly, to a method of converting an SMS (Short Message Service) message into an MMS (Multimedia Message Service) compliant image file (hereinafter, referred to simply as a "photograph"), transmitting or storing such converted photograph, and a mobile terminal performing such functions.

2. Description of the Background Art

In general, SMS (Short Message Service) messages (i.e., text messages) are created, transmitted and received in a mobile communication network between mobile terminals via a base station. A Mobile Terminated SMS (MT SMS) is one type of basic service in SMS, wherein a message is transmitted to a subscriber's terminal in a point-to-point manner.

The SMS technology which allows the transmission and reception of SMS messages is useful when voice call communications is not appropriate or not desired. For example, the user may not wish to be disturbed while in a movie theater or during a business meeting. Also, compared to a voice call service, the short (text) message service is typically less expensive or even free of charge. Thus, the SMS service has a considerably high utilization ratio among the various types of communication services, because the user may communicate with other with minimal communication costs.

However, in case of currently used mobile terminals, a user must continuously manage the storage capacity of a message inbox (or other storage means) by deleting previously received messages in order to free up storage space to allow the user to receive new incoming messages due to the limits in storage capacity.

In addition, special graphical icons, symbols, characters, and the like (such as a star (★), a smiley face (☺), a heart (♡), etc.) used to compose an SMS message may be incompatible between different types and models of mobile terminals or mobile terminal models of different manufacturers. Special graphical icons may include the so-called "emoticons" which are graphics having multiple colors, shapes or representations of movements that are intended to convey the user's emotions and intentions.

FIG. 1 is a diagram illustrating one example of a problem encountered in the related art.

As shown in FIG. 1, when the user sends an SMS message having been composed by using emoticons in a mobile terminal that supports the displaying of emoticons, to a recipient's mobile terminal which does not support the displaying of emoticons, the received emoticons are omitted or incorrectly displayed on the recipient's mobile terminal and only the remaining letters and symbols in the received message are displayed.

In the related art, even if the user wishes to compose and transmit a message by using special characters and/or emoticons, the contents of the received message (text, special characters, icons, etc.) may be distorted (garbled) or the special characters and the emoticons may be omitted when displayed on the recipient's terminal. This causes a waste of time and money for the sender who created messages that will not be properly displayed to the recipient. Also, wireless (radio) communication resources are unnecessarily used.

SUMMARY OF THE INVENTION

One aspect of the present invention involves the recognition by the present inventors of the drawbacks in the related art, as explained above. Based upon such recognition, improvements in method of converting a message into a photograph as used in a mobile terminal can be achieved according to the present invention.

Certain features that may be part of the converting the message into the photograph method and system will not be described in much detail, merely to prevent the characteristics of the present invention from being obscured. However, such additional features may also be part of the converting the message into the photograph system and method of the present invention, as would be understood by those skilled in the art.

The present invention has been conceived from the recognition by the present inventors that, despite the possible incompatibilities between various types of mobile terminals for displaying special characters, icons and symbols which may be included in an MT SMS message, many such mobile terminals (e.g., Multimedia Message Service (MMS) capable mobile terminals and mobile terminals capable of displaying basic graphics and images included within so-called "Enhanced Messaging Service" (EMS) messages) are nevertheless forwardly compatible, that is, fully capable of displaying photographs (i.e., compressed or uncompressed bit-mapped images) included within the received MMS (or EMS) messages.

The present invention can take advantage of non-utilized functions, which are available in many mobile terminals equipped with built-in or attachable digital camera modules (i.e., so-called camera phones) which are capable of capturing photographic images and also motion video sequences of successive photographic images, and then storing the captured images or videos in digital format. Such camera phones are typically capable of capturing a photographic image that can be displayed (or pre-viewed) on a display screen of the mobile terminal. Pixel data that is representative of the captured image is digitally processed and stored in a memory associated with the display screen, to thus allow the displayed image to be converted into an image data file.

The present invention may be implemented by employing such functionality, for capturing the image of an SMS message being displayed on the display screen of the mobile terminal, and processing the displayed data in a manner similar to a photographic image, to thereby provide an MMS compliant image data file, i.e., a digital photograph.

Therefore, a feature of the present invention is to provide a method for converting an SMS message into an MMS compliant image (photograph), which is capable of converting stored messages into photographs and storing the converted photographs in another storage region having a certain capacity (such as an image file memory), when an SMS message storage space such as a received message inbox or a sent message inbox of a mobile terminal is relatively full or at near maximum capacity.

It is another feature of the present invention to provide a method for converting a message into a photograph (or other appropriate type of image file) in a mobile terminal which is capable of converting an SMS message into an MMS complaint photograph, and sending or storing the SMS message as an image (photo) file. By doing so, the compatibility of a recipient's mobile terminal for processing special characters, graphic emoticons, and the like can be taken into account when the sender composes an SMS message using his mobile terminal.

To achieve these and other advantages and in accordance with the present invention, as embodied and broadly described herein, there is provided a method of converting an SMS message into a photograph in a mobile terminal, comprising: selecting an SMS message to be converted into a photograph from SMS messages stored in a mobile terminal; generating an MMS compliant photograph by setting a conversion of the selected SMS message into an MMS compliant photograph; storing the thusly generated photograph; and selectively sending the thusly stored photograph in an MMS message.

To achieve these and other advantages and in accordance with the present invention, as embodied and broadly described herein, there is also provided a method for converting a message into a photograph, comprising: composing an SMS message including an emoticon; generating a photograph by setting a photographic conversion of the composed SMS message; selectively storing the thusly generated photograph; and transmitting the thusly generated or stored photograph in an MMS message.

To achieve these and other advantages and in accordance with the present invention of a mobile terminal that supports the method of converting a message (i.e. SMS message) into the photograph (i.e. MMS compliant photograph). A mobile terminal may be comprised of a (RF) transceiver to send and receive signals and data, a memory to store data and information therein, an input unit for allowing user inputs, and a display unit to display images and information, a processor cooperating with the transceiver, memory, and display unit to handle various required processing procedures such as converting a message of a first format (e.g., SMS) into a message of a second format (e.g., MMS), storing the converted message into the memory, and/or transmitting the converted message via the (RF) transceiver.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

In describing the present invention, if a detailed explanation for a related known function or structure is considered to unnecessarily digress from the gist of the present invention, such explanation will be omitted merely for the sake of brevity, but would be clearly understood by those skilled in the art.

In the following detailed description, it will be appreciated by those of ordinary skill in the relevant art that functions described as being performed by a mobile terminal may be achieved through various commands inputted by the user via an input unit (e.g., keypad) of the mobile terminal and implemented in accordance with and as a result of functional control routines, algorithms and the like, comprising software instructions of a control program being executed by a processor (and/or other hardware) of the mobile terminal.

A feature of the present invention is to convert a message composed in a first format (e.g., SMS: Short Message Service) into a message of a second format (e.g., MMS: Multimedia Message). Here, the MMS format may be one of many types of image file formats, such as JPG, GIF, PNG, BMP, and the like. Such message format conversion can be performed when sending or receiving messages or when retrieving a stored message.

As recent mobile terminals include the capability to take digital pictures and video, the various hardware and software used to perform the necessary image and graphics processing procedures can be appropriately adapted to also perform the message format conversion function of the present invention. Here, the message format conversion may include processing of the message contents as well as the processing of a background image of the message contents.

To provide greater convenience to the user, the present invention may provide a simple procedure for activating the message format conversion, by allowing the user to select a particular key or button provided on a keypad or other portion of the mobile terminal, or to select a soft key option displayed on the display screen of the mobile terminal. After prompting the user as to whether message format conversion should be performed, the user can simple press a button or choose a graphical icon to initiate the message format conversion procedure. Alternatively, such message format conversion could also be automatically performed without prompting the user. Depending upon the desired operation, the user may selected whether he wishes to be prompted or whether automatic message format conversion should be performed.

Figure 1:
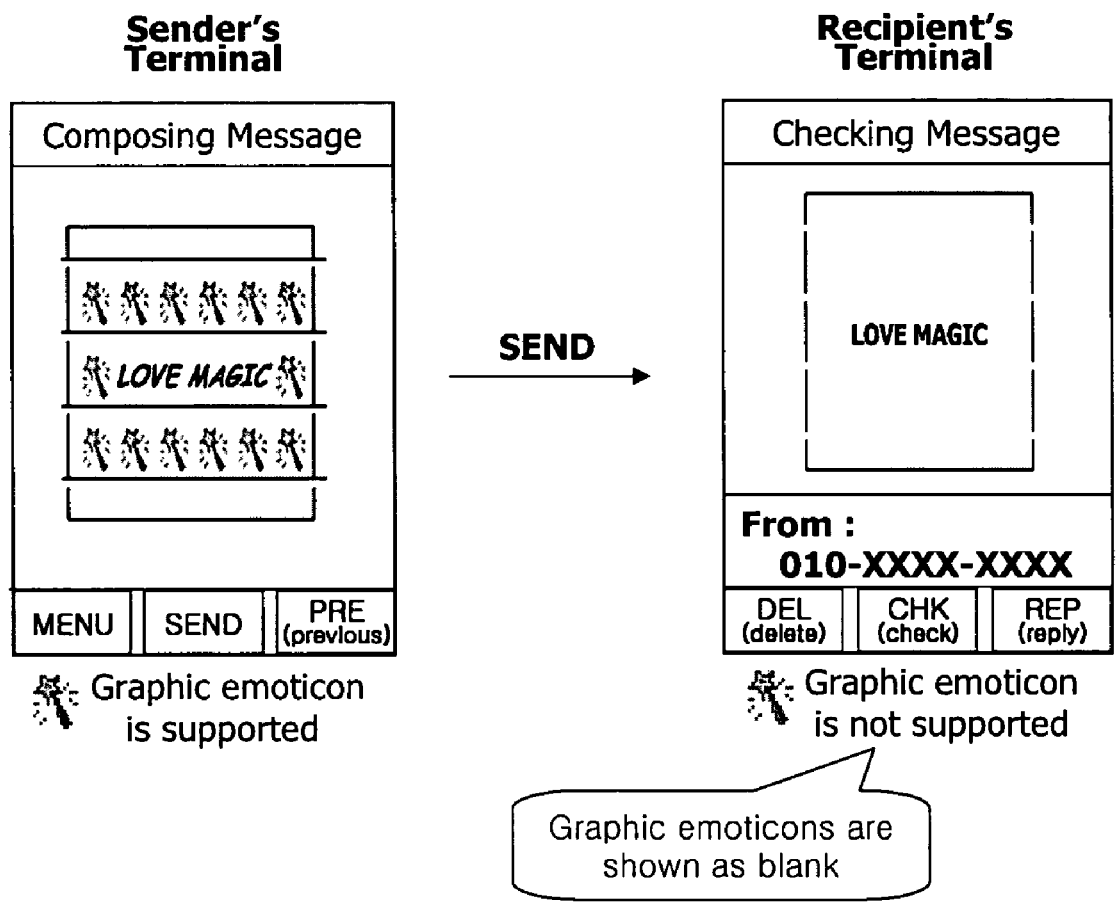
FIG. 1 is a diagram illustrating one example of a problem encountered in the related art.
Figure 2:
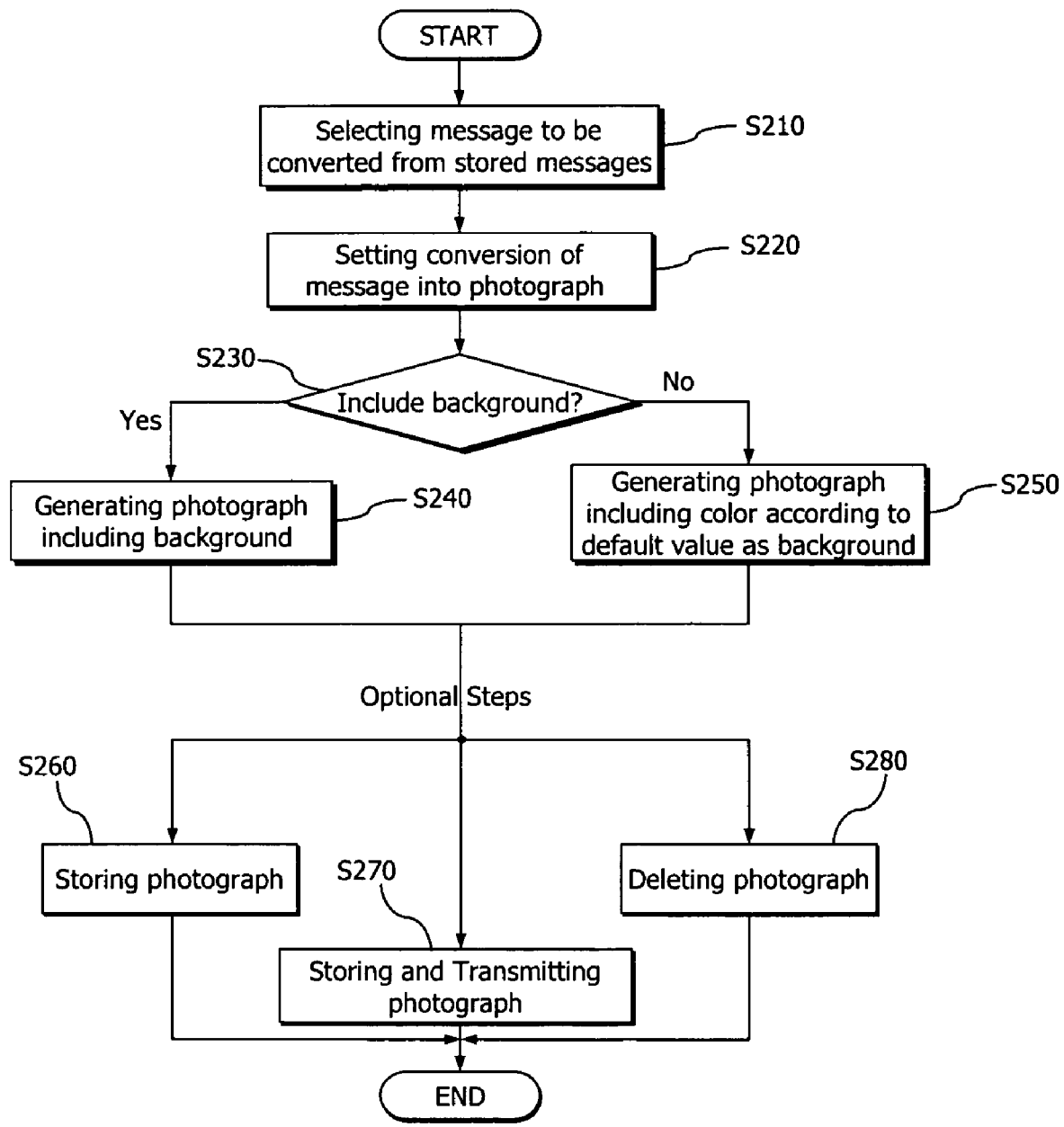
FIG. 2 is a flowchart illustrating certain procedures for an exemplary method for converting an SMS message into an MMS compliant photograph in a mobile terminal in accordance with one embodiment of the present invention.

FIG. 2 is a flowchart illustrating a process of implementing an exemplary method for converting an SMS message into an MMS compliant image (photograph) in a mobile terminal in accordance with one embodiment of the present invention.

When the capacity of an SMS message storage space (such as a message inbox or a message outbox) is full and thus no more messages can be received, or when a user wants to separately store a message having emoticons which would occupy a large amount of memory space, as shown in FIG. 2, the user selects an SMS message to be converted into an MMS compliant photograph at a location where SMS messages are stored (such as the message inbox or the message outbox) (S210) or the SMS message may be converted to the MMS compliant photograph at a message composing window.

The user having selected the SMS message may set a corresponding menu or may set a image (photographic) conversion function with respect to the selected SMS message by pressing a certain key or button (e.g. a hot-key) in order to convert the selected SMS message into an MMS compliant photograph (S220). The certain key can be a function key, such as a camera function key, for a mobile terminal having an internal or external digital camera that allows digital conversion of a message into a photograph (image).

After the user sets a function for conversion of a selected SMS message into a photograph (or image), the mobile terminal prompts the user as to whether or not to include a current background of the message by displaying a notification prompt on a display unit of the mobile terminal. For example, a message asking 'Include a current background?' may be displayed to the user (S230).

At this time, if the user chooses to include the current background (Yes), an MMS compliant image (photograph) including the current background of the selected message is generated as if the current display screen image was captured by a camera (S240). Meanwhile, if the user chooses not to include the current background (No), an MMS compliant photograph is generated by using a default value for the background of the message or using a image which is selected by the user as for the background of the message (S250). If the background is to be included, outputting the background in a blurred manner and adjusting a font size such that the message contents included in the MMS message and sender information (i.e. contact information, message sending time . . . etc) are all outputted on a display region. The message contents and sender information may be outputted as OSD (On-Screen Display) format. Also, an image file may be generated using a still-image coding to currently displayed information that is stored in graphic buffer.

Once the MMS compliant photograph resulting from conversion of the message has been generated, upon a user's setup, such photograph may be stored in a memory (e.g., photo album database) of the mobile terminal, transmitted after storing, or deleted (S260-S280). That is, if the user sets a 'storing' set-up, the generated MMS compliant photograph is updated in photograph album database. If the user sets a 'transmitting after storing' set-up, the generated MMS compliant photograph is updated in photograph album database, then moved to message transmission setting screen to be inputted receiving information from the user and a transmission setup information (i.e. transmission options). Also, if the user sets a 'deleted' set-up, the generated MMS compliant photograph is deleted (S220) or return to S230 to be inputted a photographic conversion setting or background image setting. It would be well known to those skilled in the art that other setting or functions may be performed without departing from the spirit or essential characteristics of presented invention. it should also be understood that that the updated MMS compliant photograph in the photograph album database may be used for a menu related to the album or photograph that can be insert in MMS message composing.

The stored photograph may be sent to one or more recipients according to the user's setting of a corresponding menu or upon user selection made in response to a notification prompt, such as 'Send the stored photograph?' that is displayed to the user (S270).

When the user sets an option for photograph sending, the stored photograph is attached to an MMS (Multimedia Message Service) message, and the MMS message is transmitted to at least one recipient phone number or e-mail address (S280).

Figure 3:
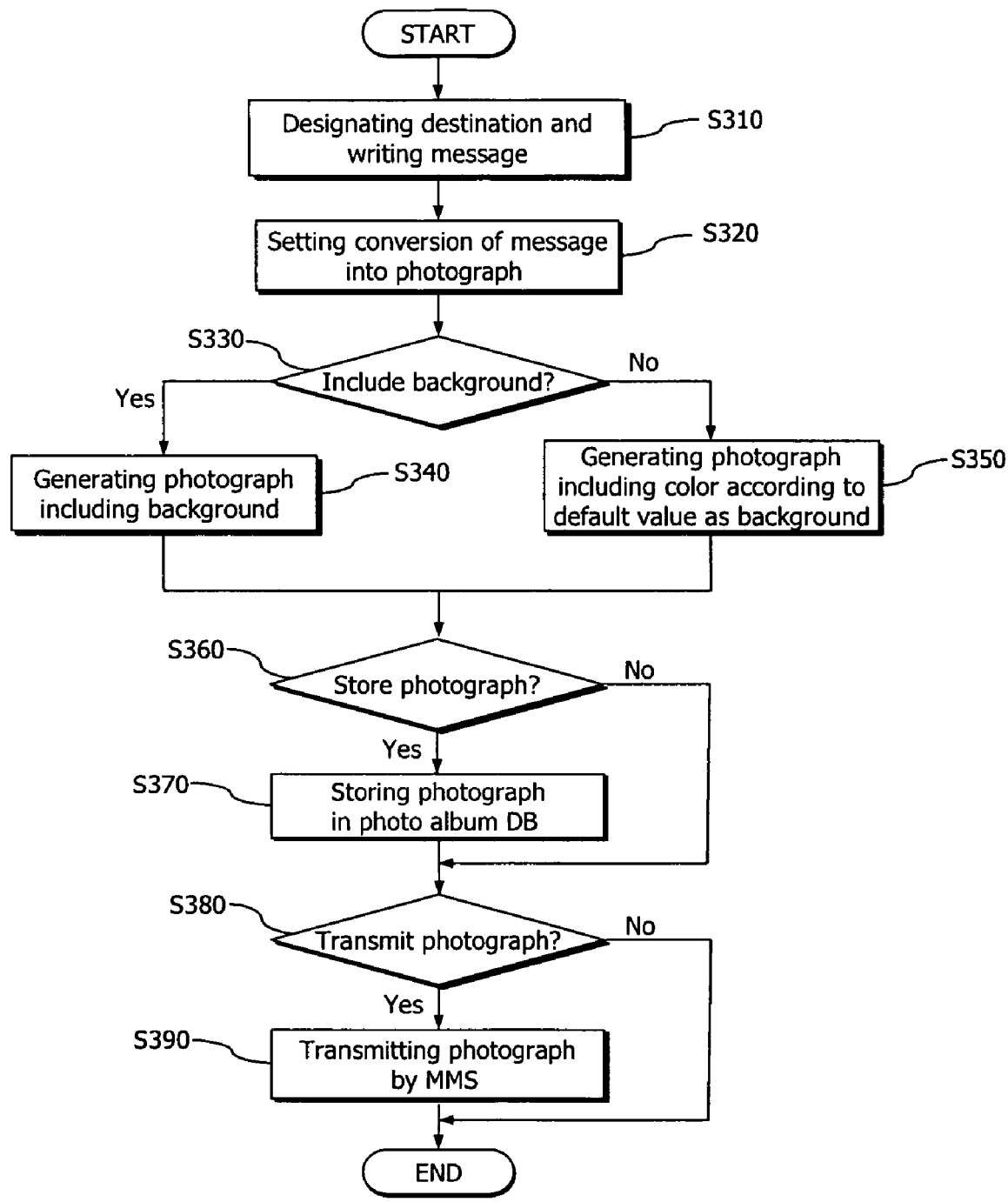
FIG. 3 is a flowchart illustrating certain procedures for an exemplary method for converting an SMS message into an MMS compliant photograph in a mobile terminal in accordance with another embodiment of the present invention.

FIG. 3 is a flowchart illustrating procedures for an exemplary method for converting an SMS message into an MMS compliant image format (photograph) for a mobile terminal in accordance with another embodiment of the present invention.

When the user composes and transmits an SMS message including special characters, emoticons, graphics, etc., the user may transmit the SMS message upon converting into an appropriate image format, such that the recipient's mobile terminal (which may not be compatible with the user's own mobile terminal) can still properly receive the contents of the SMS message. As shown in FIG. 3, the user selects an option in a message menu in order to compose a message, then inputs a phone number or e-mail address of at least one recipient who is to receive the message, and the user can begin to compose a new message (S310). Here, the user may be allowed to first compose his message and then enter the contact information (e.g. phone number, e-mail address, etc.) of the recipient.

After composing the message, the user can set a conversion option such that the composed message may be converted into an MMS compliant image format (photograph). Such setting (or selection) procedure may be achieved by using a menu having a tree-like structure or by directly pressing a button (i.e., hot-key) for image format conversion (S320).

After setting the option for converting the message into an image format, the user may be prompted as to whether or not to include a background image. For example, a prompt such as, 'Include the current background?' can be displayed on the display unit (S330).

At this time, if the user decides to include a background image (Yes), an MMS compliant image (photograph) including the current background of the message is generated as if the current display screen image was captured by a camera (S340). Meanwhile, if the user chooses not to include a background image (No), an image is generated by using a color designated as a default value as the background of the message (S350). The default value may be white, but can be changed into different colors, graphics, images, photographs, videos, etc. for the background set by the user.

As mentioned in hereinabove, If the background is to be included, outputting the background in a blurred manner and adjusting a font size such that the message contents included in the MMS message and sender information (i.e. contact information, message sending time . . . etc) are all outputted on a display region. The message contents and sender information may be outputted as OSD (On-Screen Display) format. Also, an image file may be generated using a still-image coding to currently displayed information that is stored in graphic buffer.

After the MMS compliant image (photograph) generation procedures are completed, it is determined whether or not the generated image (photograph) should be stored according to the user's setting of a corresponding menu or according to the user's selection made when a notification prompt such as, 'Store the generated photograph?' is displayed to the user (S360).

As a result of such determination, the generated image (photograph) may be stored in a memory (e.g., photo album database) in the mobile terminal (S370).

In addition, it can be determined whether or not to transmit the image (photograph) according to the user's setting of a corresponding menu or according to the user's selection made when a notification prompt such as, 'Transmit the photograph?' is displayed to the user (S380).

At this time, if the user sets the transmission of the image (photograph), the mobile terminal attaches the generated or stored photograph to an MMS message and transmits such to a phone number or an e-mail address of at least one recipient designated by the user.

As described so far, the method of converting an SMS message into an MMS compliant image format (photograph) for a mobile terminal in accordance with the present invention may provide more convenience to the user. Namely, the user need not continuously manage an SMS inbox (i.e., deleting old text messages when the inbox is full). Also, the user can convert his SMS messages of relatively large size (due to special characters, emoticons, etc. used in the message) into an image format file. These converted (image format) messages can be stored in memory (i.e., a photo album database) and transmitted to a recipient.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Figure 4:
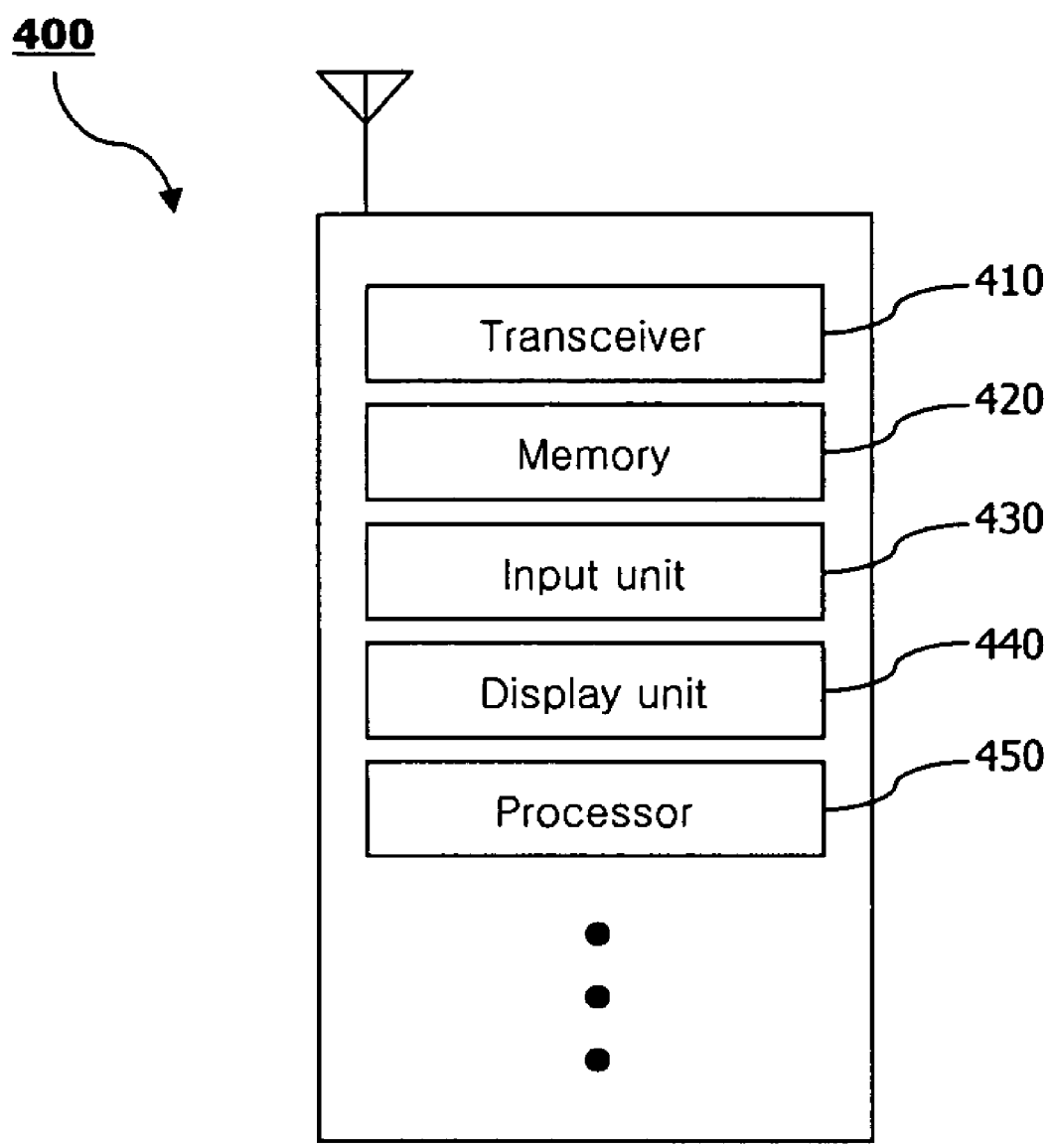
FIG. 4 shows an exemplary structure of a mobile terminal that may implement the features of the present invention.

FIG. 4 shows an exemplary structure of a mobile terminal that supports the features of the present invention. A mobile terminal 400 may be comprised of a (RF) transceiver 410 to send and receive signals and data, a memory 420 to store data and information therein, and a processor 450 cooperating with the transceiver 410 and memory 420 to handle various required processing procedures. Here, the processor 450 may cooperate with different hardware and/or software components (modules) that may be part of the processor 450 and/or may be separate entities, such as a user interface module (not shown in Figure), a image converting module (not shown in Figure), and a background processing module (not shown in Figure) to implement the present invention method of converting a message of a first format (e.g., SMS) into a message of a second format (e.g., MMS). Additionally, an input unit 430 (e.g., microphone, keypad, function buttons, touch-sensitive input device, etc. to allow audible, visual, and/or tactile inputs) and an output unit (not shown in Figure) (e.g., speaker, display unit, touch-screen, vibration unit, etc. to provide audible, visual, and/or tactile outputs) are also part of the mobile terminal 400 of the present invention.

Specifically, FIG. 4 shows an exemplary structure of a mobile terminal that converts a SMS message into a MMS photograph compliant image. A mobile terminal 400 may be comprised of (RF) transceiver 410 to send and receive signals and data, a memory 420 to store data and information therein an input unit 430 (e.g., microphone, keypad, function buttons, touch-sensitive input device, etc. to allow audible, visual, and/or tactile inputs) to generate a signal for capturing and transferring the image information displayed on the display unit 440; a processor cooperating with the transceiver, memory, and display unit to handle various required processing procedures such as converting a message of a first format (e.g., SMS) into a message of a second format (e.g., MMS), storing the converted message into the memory, and/or transmitting the converted message via the (RF) transceiver.

Here, when a message is displayed on display unit (i.e. a user composes a message, a user checks a pre-stored message) the processor 450 performs a image (photographic) conversion function with respect to the displayed/selected message by selecting a menu for the conversion function or by pressing a certain key or button (e.g. a hot-key).

The processor 450 will perform that when a message is displayed while composing a message or while confirming a stored message, if an option menu corresponding to photograph conversion is selected or if a hot key used for performing photograph conversion is operated, the processor performs photograph conversion of the displayed message. The processor performs a capture operation with respect to the screen that is currently displayed on the display unit in order to generate a photograph including the current background of the message as if a photograph of the screen is taken, or generates a photograph by using an image set as a default value or by using an image selected by the user. The image set as the default value is a white background and may be changed to a different color or image, photograph, video, or the like for use as a background upon user selection.

If the background is to be included, outputting the background in a blurred manner and adjusting a font size such that the message contents included in the MMS message and message sender information are all outputted on a display region; outputting the message contents and the message sender information as an on-screen display format; and performing still image coding for the currently displayed information to generate an image file. The processor selectively performs either storing or temporarily storing of the generated image file in the memory. That is the processor performs that transmitting, the stored or temporarily stored image file according to user settings, to at least one particular recipient; and formally storing the image file into an album database after transmission or immediately deleting the image file after transmission.

The terminal 400 may further comprise an input unit such as "microphone" and/or "touch-screen" and an input port to be engaged with an external input source (keyboard) in addition to the input unit 430 as cited earlier.

In addition, the terminal 400 may comprise an output port to be engaged with an external output unit, such as a television or monitor, to output image and audio signals.

Furthermore, the mobile terminal 400 may be configured to comprise a storage media receiving port that allows an external storage medium (such as a memory card) to be inserted thereto for storing data therein. Also, an additional (optional) function unit (such as a broadcast reception module, MP3 module, Internet banking module, etc.) may be provided.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile terminal 400 in accordance with the present invention.

The present invention provides a mobile terminal comprising: an input unit to allow a user to compose a message to be sent; an output unit to output to the user, the message to be sent or a message that is received; a processor cooperating with the input unit and the output unit, and comprised of, a user interface module to provide a menu of options related to message format conversion for user selection thereof, an image converting module to convert a first format of the message into a second format based upon the user selection of the menu of options, and a background processing module to process a background image related to the message that has been converted into the second format.

The mobile terminal of the present invention may further comprise: a transceiver to send and receive messages; and a memory to store the sent and received messages, wherein the processor comprising the user interface module, the image converting module, and the background processing module further cooperates with the transceiver and the memory to, send messages after converting into the second format, receive messages that have been converted into the second format, and store at least the sent messages having the second format or the received messages having the second format in the memory.

Here, the first format may be associated with a Short Message Service, and the second format may be associated with a Multimedia Message Service. Also, the second format may be an image file format comprising at least one of a JPG, GIF, PNG, and BMP formats.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of converting a Short Message Service (SMS) message into a Multimedia Message Service (MMS) compliant image in a mobile terminal, the method comprising:
   selecting the SMS message to be converted from one or more SMS messages stored in the mobile terminal;
   converting the SMS message into a photograph comprising a background image, wherein the background image is a default background image of a white color or a user selected background image of a color other than the white color, a user selected image, or a video;
   storing the photograph in a photo album database of the mobile terminal; and
   transmitting the photograph in an MMS message.

2. The method of claim 1, wherein the SMS message includes an emoticon.

3. The method of claim 1, wherein the user selected background image is a current background of the SMS message.

4. The method of claim 1, wherein converting the SMS message is performed in response to an operation of a hotkey.

5. The method of claim 4, wherein the hotkey is a camera key which is separately provided for a photographing function of the mobile terminal.

6. The method of claim 1, wherein converting the SMS message comprises:
   displaying the default background image or the user selected background image in a blurred manner and adjusting a font size of contents of the MMS message and message sender information to enable display of the contents and the message sender information in a display region;
   displaying the contents and the message sender information as an on-screen display format; and
   performing still image coding on the contents, the message sender information, and the default background image or the user selected background image if included to generate the MMS compliant image file.

7. A method for converting a Short Message Service (SMS) message into a Multimedia Message Service (MMS) compliant image, the method comprising:
   composing the SMS message, wherein the SMS message comprises an emoticon;
   converting the SMS message into an MMS compliant photograph comprising a background image, wherein the background image is a default background image of a white color or a user selected background image of a color other than the white color, a user selected image, or a video;
   storing the MMS compliant photograph in a photo album database; and
   transmitting the MMS compliant photograph to a phone number or an e-mail address previously designated by a user.

8. The method of claim 7, wherein the user selected background image is a current background of the SMS message.

9. The method of claim 7, wherein converting the SMS message is performed in response to an operation of a hotkey by the user.

10. The method of claim 7, wherein the hotkey is a camera key which is separately provided for use when taking photographs.

11. The method of claim 7, wherein the step of generating the photograph comprises:
    displaying the default background image or the user selected background image in a blurred manner and adjusting a font size of contents of the MMS message and message sender information to enable display of the contents and the message sender information in a display region;
    displaying the contents and the message sender information as an on-screen display format; and
    performing still image coding on the contents, the message sender information, and the default background image or the user selected background image to generate an image file.

12. A mobile terminal comprising:
    a transceiver for transmitting and receiving data;
    a memory for storing data;
    an input unit for allowing user inputs;
    a display unit for displaying images and information;
    a controller cooperating with the transceiver, memory, and display unit, wherein the controller is configured to convert a message displayed in the display unit into a photograph and store the photograph into the memory, or to transmit the photograph via the transceiver,
    wherein the controller converts the message displayed in the display unit while the message is composed or selected, if an option menu corresponding to image conversion is selected or if a hotkey used for performing image conversion is operated.

13. The mobile terminal of claim 12, wherein the controller performs a capture operation with respect to a screen that is currently displayed on the display unit in order to generate the photograph including a current background of the message, or generate the photograph by using a default background image or a user selected background image.

14. The mobile terminal of claim 12, wherein the photograph comprises a background image, wherein the background image is a default background image of a white color or a user selected background image of a color other than the white color, a user selected image, or a video.

15. The mobile terminal of claim 12, wherein the controller is further configured to display a default background image or a user selected background image in a blurred manner if the default background image or the user selected background image is to be included and adjust a font size of contents of the message and message sender information, display the contents and the message sender information as an on-screen display format, and perform still image coding on the contents, the message sender information, and the default background image or the user selected background image if included to generate an image file.

16. The mobile terminal of claim 15, wherein the controller is further configured to store the image file in the memory.

17. The mobile terminal of claim 16, wherein the controller is further configured to transmit the stored image file according to a user setting to at least one recipient and store the image file into an album database or delete the image file after transmission.

18. A mobile terminal comprising:
an input unit to allow a user to compose a message to be sent;
an output unit to display the message;
a processor cooperating with the input unit and the output unit, the processor comprising:
  a user interface module to provide a menu of options related to message format conversion;
  an image converting module to convert a first format of the message into a second format in response to a selection of an option menu or an operation of a hotkey when the message is displayed during the composition of the message or if the message is selected, wherein the option menu corresponds to an image conversion and the hotkey is used for performing the image conversion; and
  a background processing module to process a background image related to the message that has been converted into the second format.

19. The mobile terminal of claim 18, further comprising:
a transceiver to send and receive the message; and
a memory to store the message,
wherein the processor is configured to send the message after the conversion into the second format, receive the message that has been converted into the second format, and store the message in the memory.

20. The mobile terminal of claim 19, wherein the first format is associated with a Short Message Service, and the second format is associated with a Multimedia Message Service.

21. The mobile terminal of claim 19, wherein the second format is an image file format comprising at least one of a JPG, GIF, PNG, and BMP formats.

* * * * *